UNITED STATES PATENT OFFICE.

KURT DESAMARI, OF COLOGNE, GERMANY, ASSIGNOR TO SYNTHETIC PATENTS CO., INC., OF NEW YORK, N. Y., A CORPORATION OF NEW YORK.

AZO COLORING-MATTER.

1,125,073.     Specification of Letters Patent.     Patented Jan. 19, 1915.

No Drawing.     Application filed April 1, 1914. Serial No. 828,780.

*To all whom it may concern:*

Be it known that I, KURT DESAMARI, doctor of technical arts, chemist, citizen of the German Empire, residing at Cologne-on-the-Rhine, Germany, have invented new and useful Improvements in Azo Coloring-Matters, of which the following is a specification.

I have found that by coupling the diazo compounds prepared from the carboxylic acids obtainable by oxidation of acetyldehydrothiotoluidins and subsequent saponification e. g.

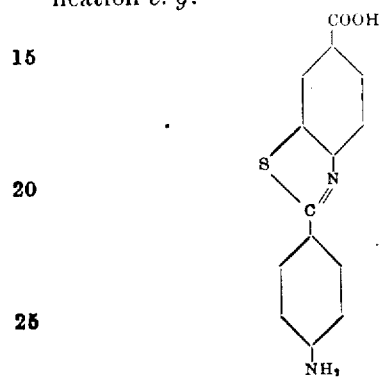

with an aceto-acetic-arylamid having most probably the formula: $CH_3-CO-CH_2-CO-NH-R'$ (R'=an aryl e. g. $-C_6H_5$, $-C_6H_4-COOH$, $-C_6H_4-CH_3$, $-C_6H_4-OCH_3$, coloring matters having in a free state most probably the formula:

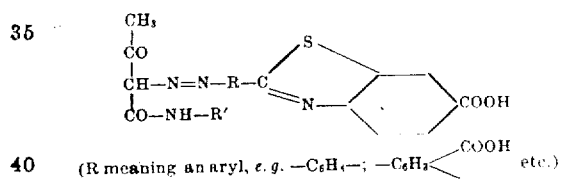

(R meaning an aryl, e. g. $-C_6H_4-$; $-C_6H_3\lt{}^{COOH}$ etc.)

easily soluble in water are obtained which dye cotton in greenish-yellow shades of great purity.

The new products are after being dried and pulverized yellowish powders. Their sodium salts are easily soluble in water with a yellowish coloration. They yield upon reduction with stannous chlorid and hydrochloric acid a para-amino-arylthiazole-carboxylic acid.

In order to illustrate the new process more fully the following examples are given, the parts being by weight:

Example 1: 270 parts of the carboxylic acid, obtained by oxidation of acetyldehydrothiotoluidin and by subsequent saponification of the product of oxidation, the para-aminophenylphenthiazole-carboxylic acid, are diazotized with 69 parts of sodium nitrate and 30 parts of concentrated HCl. A solution of 221 parts of aceto-acetic-anilid-para-carboxylic acid ($CH_3-CO-CH_2-CO-NH-C_6H_4-COOH$) in 120 parts of caustic soda lye (33 per cent.) is added to the resulting diazo solution to which an excess of sodium bicarbonate has been added and which has to be kept at a temperature of from 0–5° C. The combination is soon finished. The easily soluble dyestuff is isolated by salting it out. It dyes cotton in pure very greenish-yellow shades. It has in a free state most probably the formula:

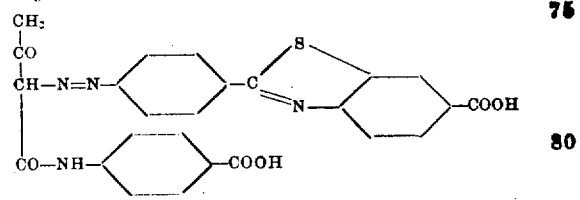

Example 2: 270 parts of para-aminophenyl-phenthiazole-carboxylic acid are diazotized and a solution of 207 parts of aceto-acetic-para-anisidid: ($CH_3-CO-CH_2-CO-NH-C_6H_5-OCH_3$) in the calculated quantity of caustic soda lye is added to the diazo solution to which an excess of sodium bicarbonate has been added. The dyestuff thus obtained is isolated by salting it out. It dyes cotton in pure yellow shades.

I claim:—

1. The new dyestuffs derivable from a diazotized para-aminophenylphenthiazole-carboxylic acid and aceto-acetic-arylamid having in a free state most probably the formula:

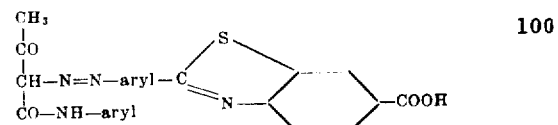

which are in the shape of their sodium salts after being dried and pulverized yellowish powders soluble in water with a yellowish coloration; yielding upon reduction with stannous chlorid and hydrochloric acid a para-amino-aryl-phenthiazole-carboxylic acid; and dyeing cotton yellow shades, substantially as described.

2. The new dyestuff derivable from diazotized para-aminophenylphenthiazole-carboxylic acid and aceto-acetic-anilid-carboxylic acid having in a free state most probably the formula:

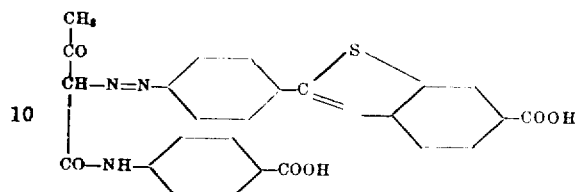

which is in the shape of its sodium salt after being dried and pulverized a yellowish powder soluble in water with a yellowish coloration; yielding upon reduction with stannous chlorid and hydrochloric acid para-aminophenylphenthiazole-carboxylic acid; and dyeing cotton in pure greenish-yellow shades, substantially as described.

In testimony whereof I have hereunto set my hand in the presence of two subscribing witnesses.

KURT DESAMARI.

Witnesses:
Louis Vandory,
Hans Brückner.

It is hereby certified that in Letters Patent No. 1,125,073, granted January 19, 1915, upon the application of Kurt Desamari, of Cologne, Germany, for an improvement in "Azo Coloring-Matters," errors appear in the printed specification requiring correction as follows: Page 1, line 61, for the word "nitrate" read *nitrite;* page 2, line 10, on the left-hand side of the second benzene-ring insert the letter *N;* and that the said Letters Patent should be read with these corrections therein that the same may conform to the record of the case in the Patent Office.

Signed and sealed this 13th day of April, A. D., 1915.

[SEAL.]                                                J. T. NEWTON,
*Acting Commissioner of Patents.*